E. L. LEINBACH.
ANCHORING OR FASTENING DEVICE FOR CABLE ENDS.
APPLICATION FILED MAY 4, 1921.
1,408,212.  Patented Feb. 28, 1922.
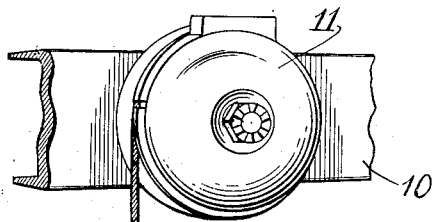
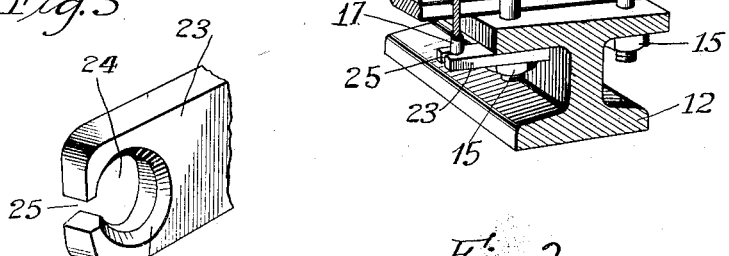
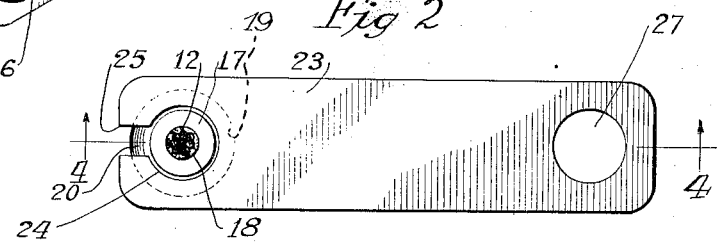
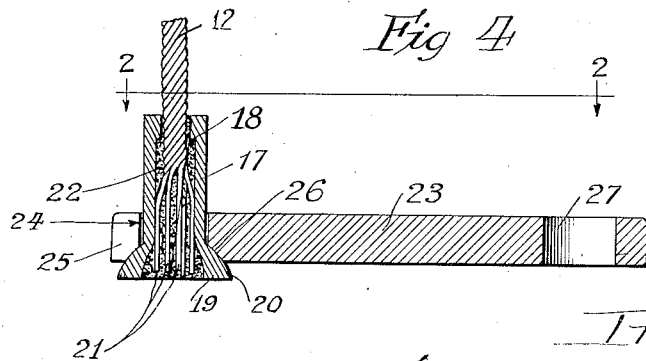
Inventor,
Edward L. Leinbach,

UNITED STATES PATENT OFFICE.

EDWARD L. LEINBACH, OF CHICAGO, ILLINOIS.

ANCHORING OR FASTENING DEVICE FOR CABLE ENDS.

1,408,212.  Specification of Letters Patent.  Patented Feb. 28, 1922.

Application filed May 4, 1921. Serial No. 466,791.

*To all whom it may concern:*

Be it known that I, EDWARD L. LEINBACH, a citizen of the United States, residing at Chicago, in the county of Cook and State of Illinois, have invented certain new and useful Improvements in Anchoring or Fastening Devices for Cable Ends, of which the following is a specification.

This invention relates to improvements in anchoring or fastening devices for cable ends, particularly adapted, though not necessarily limited in its use with shock absorbers for vehicles.

In shock absorbers of the type embodying a flexible strap or cable which forms a connection between the parts, the relative movement of which it is desired to check or retard, it is necessary to fasten or anchor the strap or cable by one extremity to one of the parts. Heretofore considerable difficulty and inconvenience has been experienced in this respect in that the fastening for the end of the cable or strap will not hold, with the result that the end of the cable, under the sudden strain and shock to which it is subjected will pull out of or break away from the fastening or securing means. Furthermore, the constant bending back and forth of the cable adjacent the end anchoring means causes the cable to crystallize and break.

To overcome these difficulties and objections and to provide improved means for flexibly and securely anchoring the end of the cable in such manner that the same may be readily attached to the part to which it is to be anchored and as readily detached therefrom, is one of the objects of the present invention.

To the attainment of these and the accomplishment of other new and useful objects as will appear, the invention consists in the features of novelty in substantially the construction, combination and arrangement of the several parts hereinafter more fully described and claimed and shown in the accompanying drawing illustrating this invention and in which—

Figure 1 is a detail perspective view showing the manner of anchoring the end of a cable of a shock absorber.

Figure 2 is a view taken on line 2—2, Figure 4.

Figure 3 is a detail perspective view of one end of the anchoring clip.

Figure 4 is a view taken on line 4—4, Figure 2.

Referring more particularly to the drawing the numeral 10 designates a suitable portion of the vehicle body to which the shock absorber 11 is secured in any suitable manner.

12 designates a supporting member, upon which the springs 13 rest and are secured by means of fastening clips 14, having nuts 15 thereon.

The shock absorber 11, of the type shown, embodies a cable 16, which forms connection of the shock absorber between the elements 10 and 12, and serves as a means for operating the shock absorber when the parts 10 and 12 are moved relatively with relation to each other.

The end of the cable 16 is anchored to the element 12 and to that end there is provided a fitting member 17, which is of a tubular construction and is preferably provided with an internal shoulder 18 adjacent one end thereof. The element 17 is enlarged preferably at the opposite end thereof to form a circumferential enlarged portion 19, the face 20 of which portion 19 is preferably convexed.

The cable 12 and the element 17 are secured together in any suitable manner preferably by inserting the end of the cable 12 into the element 17 and allowing the extremities 21 of the cable to separate or expand with respect to each other, after which the tubular element 17 is filled with suitable material 22, such as lead or the like, and in which material the ends 21 of the cable are embedded.

When the element 17 is thus secured to the end of the cable 12, it is almost impossible to detach the element 17 from the end of the cable unless an abnormal pressure is brought to bear between the cable 12 and the element 17.

An anchoring clip 23 is provided with an opening 24 therethrough, preferably in one end thereof and extending through one edge of the element 23 is a reduced inlet for the opening 24.

The element 23 is provided with a countersunk portion 26 encompassing the opening 24 and this countersunk portion 26 is preferably concaved so as to receive the convexed surface 20 of the portion 19 of the element 17.

The element 23 is secured in position upon any suitable portion of the vehicle but preferably upon the element 12 and to that end the element 23 is provided with an opening 27 through which a portion of one of the clips 14, is adapted to pass and the nut 15 is screwed upon the clip 14 for holding the element 23 between the element 12 and the nut 15.

In use, and when the element 23 is thus secured in position, and the shock absorber is secured to the portion 10, the cable 16 is withdrawn from the shock absorber and is connected with the element 23 by passing a portion of the cable above the end of the element 17 through the entrance opening 25, into the opening 24, after which the cable is tightened so as to cause the convexed surface 20 of the element 18 to be seated in the concaved portion 26 of the opening 24.

The opening 25 is of a diameter considerably smaller than the external diameter of the element 17, so that the parts will not become accidentally detached, but is of a diameter slightly larger than the external diameter of the cable 16, so as to permit the cable, when desired, to be passed into and out of the opening 25. The element 17 is also preferably of a length considerably greater than the thickness of the element 23, so that the parts will not become accidentally disengaged.

With this improved construction it will be manifest that the convex and concave portions 20 and 26 will form a ball joint to permit the connected parts to pivot with respect to each other and at the same time, and in order to properly position the cable and the element 17 with respect to the shock absorber, the nut 15 may be loosened and the element 23 shifted about the end of the clip 14 as a pivot until it has been properly positioned, after which the nut may be tightened and the element 23 will be securely held in place.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. In combination a cable, a fitting connected with one end of the cable, said fitting having an enlarged portion forming a circumferential shoulder, a clip like element, and means whereby said element may be anchored, there being an opening through the clip for receiving the said fitting, the diameter of said opening being less than the diameter of the said shoulder, said opening having a reduced entrance extending through one edge of the said element.

2. In combination a cable, a fitting connected with one end of the cable, said fitting having an enlarged portion forming a circumferential shoulder, a clip like element, and means whereby said element may be anchored, there being an opening through the clip for receiving the said fitting, the diameter of said opening being less than the diameter of the said shoulder, said opening having a reduced entrance extending through one edge of the said element, the said means adapting the said element for adjustment with respect to the part to which it is anchored and in a direction transverse to the length of the adjacent portion of the cable.

3. In combination a cable, a fitting connected with one end of the cable, said fitting having an enlarged portion forming a circumferential shoulder, a clip like element, and means whereby said element may be anchored, there being an opening through the clip for receiving the said fitting, the diameter of said opening being less than the diameter of the said shoulder, said opening having a reduced entrance extending through one edge of the said element, the contacting portions of the said shoulder and the said element being one convexed and the other concaved to receive the said convexed surface.

4. In combination a cable, a fitting connected with one end of the cable, said fitting having an enlarged portion forming a circumferential shoulder, a clip like element, and means whereby said element may be anchored, there being an opening through the clip for receiving the said fitting, the diameter of said opening being less than the diameter of the said shoulder, said opening having a reduced entrance extending through one edge of the said element, the said entrance being of a size greater than the diameter of a portion of the cable whereby the said cable may be passed through the same when the said element and shoulder are separated.

5. In combination a cable, a tubular fitting encompassing one end of the cable and secured thereto, said fitting having a circumferentially enlarged portion, a clip like element, and means whereby the clip may be anchored, said clip having an opening therethrough provided with a reduced entrance extending through one edge of the clip, said fitting adapted to be seated in the said opening with the enlarged portion seated against the clip, the diameter of the portion of the said fitting within the opening and on both sides of the clip being greater than the size of the said entrance opening.

6. In combination a cable, a tubular fitting encompassing one end of the cable and secured thereto, said fitting having a circumferentially enlarged portion, a clip like element, and means whereby the clip may be anchored, said clip having an opening therethrough provided with a reduced entrance extending through one edge of the clip, said fitting adapted to be seated in the said opening with the enlarged portion seated against the clip, the diameter of the portion of the said fitting within the opening and on both sides of the clip being greater than the size of the said entrance opening, the abutting portions of the said clip and the said enlarged portion of the fitting being one convexed and the other concaved to receive the said convexed portion to form a swivel joint between the parts.

7. In combination a cable, a tubular fitting encompassing one end of the cable and secured thereto, said fitting having a circumferentially enlarged portion, a clip like element, and means whereby the clip may be anchored, said clip having an opening therethrough provided with a reduced entrance extending through one edge of the clip, said fitting adapted to be seated in the said opening with the enlarged portion seated against the clip, the diameter of the portion of the said fitting within the opening and on both sides of the clip being greater than the size of the said entrance opening, one face of the enlarged portion of the said fitting being convexed and the adjacent face of the clip encompassing the said opening being concaved to receive the said convexed portion.

8. In combination, a flexible element, means connected with said element being enlarged to form a circumferential bearing shoulder, a clip like element, means whereby the element may be anchored, said element having an opening therethrough and through which opening the end of the flexible element extends, the face of the said element adjacent the said bearing shoulder being countersunk to receive the latter, and means whereby the said element and clip may be detachably connected.

9. In combination, a flexible element, means connected with said element and being enlarged to form a circumferential bearing shoulder, a clip like element, and means whereby the element may be anchored, said element having an opening therethrough and through which opening the end of the flexible element extends, the said enlarged portion being adapted to engage and rest against one face of the clip, said opening having a reduced entrance extending through one edge of the clip whereby the flexible element and clip may be interengaged and disengaged.

In testimony whereof I have signed my name to this specification, on this 30th day of April, A. D. 1921.

EDWARD L. LEINBACH.